United States Patent [19]

Wiens et al.

[11] Patent Number: 4,716,480
[45] Date of Patent: Dec. 29, 1987

[54] CARRIAGE LATCH FOR A DISC DRIVE

[75] Inventors: John P. Wiens, Santa Clara; Clifford T. Jue, Santa Cruz, both of Calif.

[73] Assignee: Seagate Technology, Scotts Valley, Calif.

[21] Appl. No.: 901,678

[22] Filed: Aug. 29, 1986

[51] Int. Cl.$^4$ .......................... G11B 5/55; G11B 21/08
[52] U.S. Cl. .................................... 360/105; 335/271; 335/277; 360/104
[58] Field of Search .................... 360/106, 105, 97–99, 360/137, 104; 335/271, 277; 74/574

[56] References Cited

U.S. PATENT DOCUMENTS

| | | | |
|---|---|---|---|
| 3,548,352 | 12/1970 | Sandoval | 335/277 |
| 4,484,241 | 11/1984 | Brende et al. | 360/105 |
| 4,625,194 | 11/1986 | Held | 335/271 |
| 4,660,120 | 4/1987 | Marzke et al. | 360/105 X |

*Primary Examiner*—Stuart N. Hecker
*Assistant Examiner*—David J. Severin
*Attorney, Agent, or Firm*—Flehr, Hohbach, Test, Albritton & Herbert

[57] ABSTRACT

A dynamic lock for a disc drive carriage incorporates a plunger that captures an extension on the carriage. The plunger is guided by a solenoid and frame. The plunger is spring loaded such that it normally is biased into the carriage to restrain the carriage in the home locking position. The solenoid can withdraw the plunger and allow release of the carriage. A counterweight rotates about a pivot provided on the frame adjacent the plunger. A finger that protrudes from the counterweight rides in a recess on the plunger. In the event of a sudden shock to the disc drive, the shock force is transmitted from the plunger through the finger to the counterweight. The counterweight is designed to be of equal mass to the plunger, whereby the shock force is neutralized, preventing the plunger from moving back toward the solenoid and releasing the carriage.

9 Claims, 6 Drawing Figures

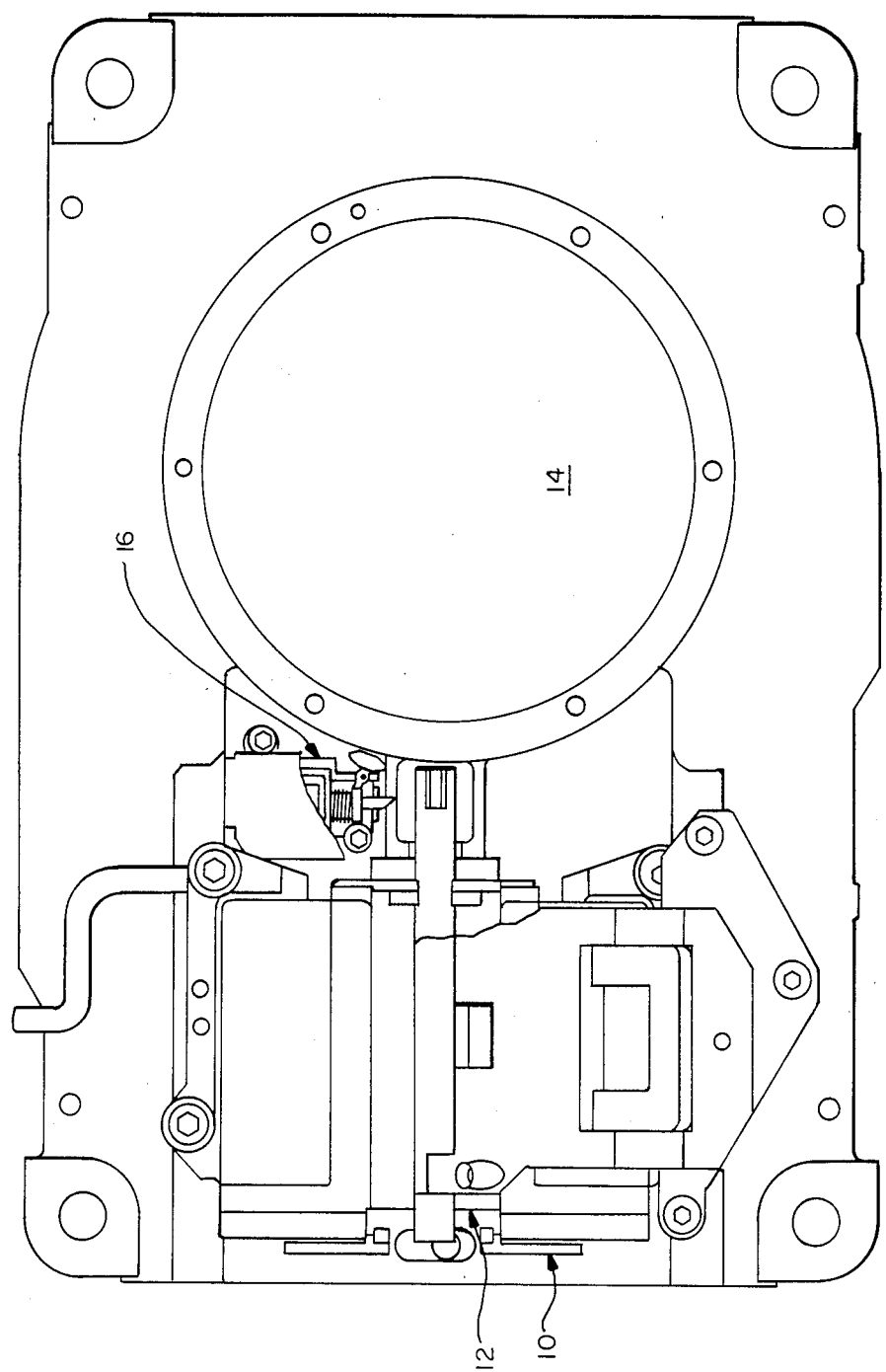
FIG.—1

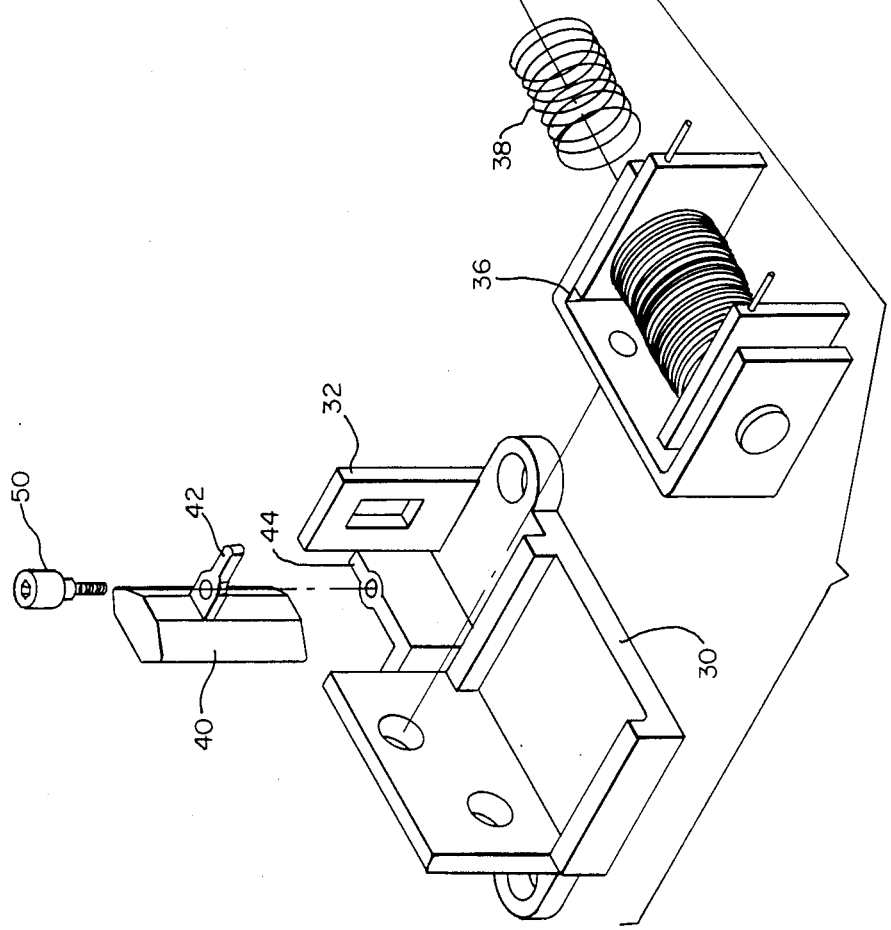

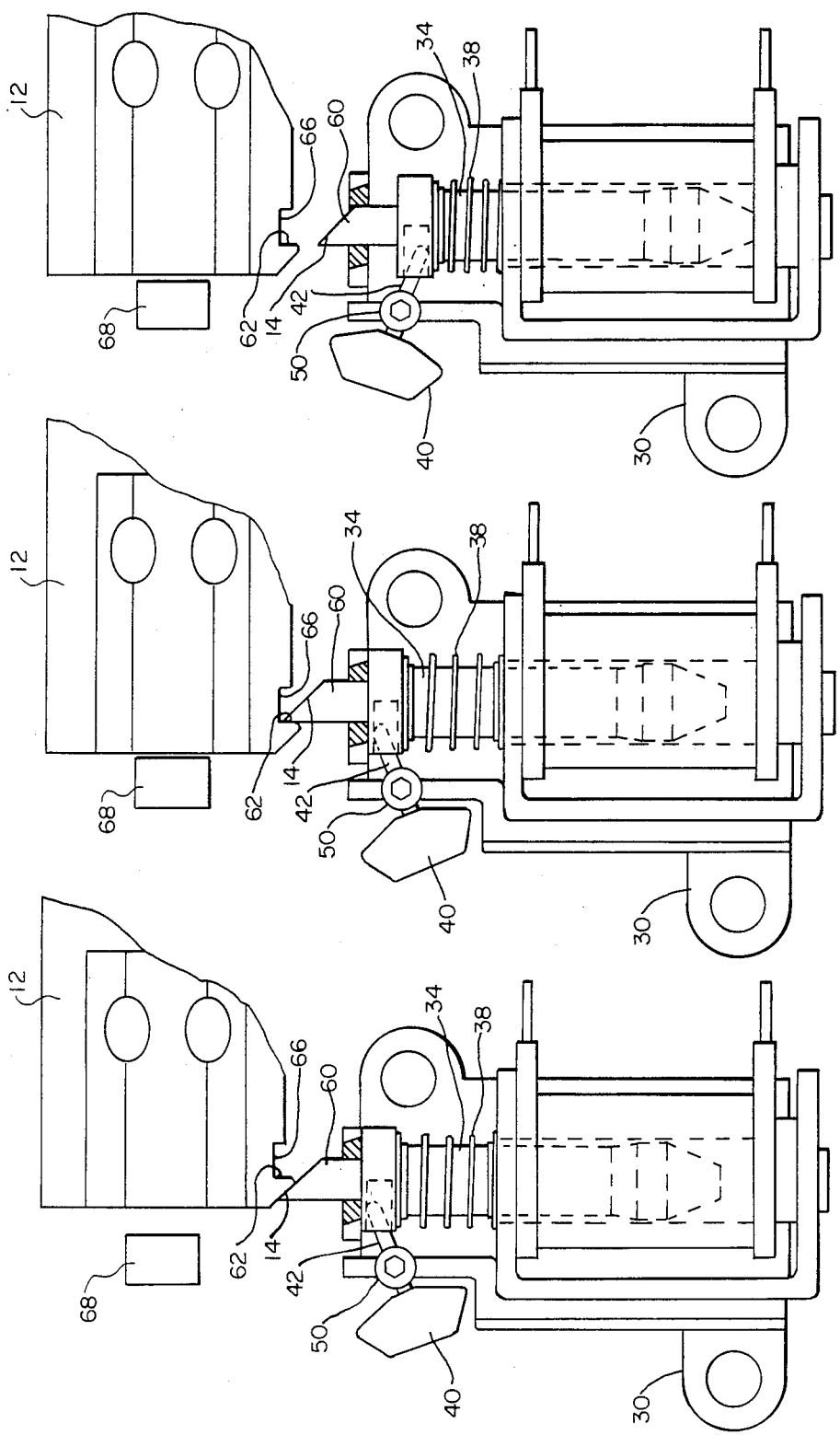

CARRIAGE LATCH FOR A DISC DRIVE

This invention is directed generally to the field of disc drives and more particularly to a mechanical lock for a carriage assembly and a disc type data storage device. The lock is particularly useful in preventing the read/write heads from moving across the discs when a sudden shock is applied to the disc drive.

As is well known, disc drive machines record and reproduce information stored on concentric tracks recorded on magnetic discs. The tracks are written and read by magnetic heads or transducers which cooperate with the surface of the disc. These heads are carried from track to track by motor driven carriages. A typical unit or actuator for providing this head positioning function is described in U.S. application Ser. No. 800,059, filed Nov. 20, 1985, and assigned to the Assignee of this invention, and incorporated herein by this reference.

It is of course apparent that the carriage should be free to move without undue restraint or drag when it is desired to move the transducer from track to track. However, it is also necessary that some device be provided to secure the carriage from free movement when power is not being applied to the motor which moves the carriage. In the absence of such a securing device, both heads and medium are subject to damage due to uncontrolled motion. This is not a problem in disc drives using a stepper motor. A stepper motor has significant detent force when no power is being applied; thus, the attached carriage is naturally restrained from undefined movement. However, with the advent of voice coil motor drives, the problem of restraining the carriage from undefined movement has become serious.

In a typical voice coil motor drive, coils and magnets are located on either side of the carriage. The motor drives the carriage by the direction and amplitude of current applied; but when not current is applied, the carriage is free to move.

It is therefore an objective of this invention to provide an improved mechanical lock for use in restraining the actuator in a disc drive.

Specifically, an objective of this invention is to prevent carriage movement in an inactive disc drive using a voice coil motor.

In the prior art, the carriage has been driven to a home position and mechanically locked in that position. However, a hard shock will release the carriage, because the solenoid which is used to automatically release the drive must inherently be inexpensive and relatively low in power. If a larger restraining spring is used to bias the latch against the carriage, then a larger and more expensive solenoid will be needed.

This problem has become even more significant with the advent of portable computers wherein the disc drive is much more frequently subjected to sudden shocks, and such shocks may occur while the drive is being carried.

Therefore, it is an objective of this invention to provide a disc drive lock which can utilize a solenoid and spring of relatively limited force which providing significant restraining force against any sudden movement of the disc drive in response to mechanical shock.

In normal operation, the carriage is driven to the home position and mechanically locked in place when power is removed from the drive. Typically it is the motion of the carriage that triggers the locking action. To minimize the energy required and to avoid producing high deceleration forces when the carriage contacts the locking mechanism, it is generally desirable that the force required to activate the latch be as low as possible.

In that in many disc drives, crash stops are provided at each end of the carriage stroke to cushion the impact of the carriage should an electronics failure cause the carriage to accelerate in an uncontrolled manner. As one of the failure modes could be an acceleration of the carriage into the home position, it would be desirable that the lock not interfere with the function of the crash stops.

These and other objectives and advantages of this invention are achieved by a dynamic lock incorporating a plunger which captures an extrension on the carriage. The plunger is guided by a solenoid and frame. The plunger is spring loaded such that it normally is biased into the carriage to restrain the carriage in the home locking position. The solenoid can withdraw the plunger and allow release of the carriage. In the preferred form of this invention, a counterweight is provided which may rotate about a pivot provided on the frame adjacent the plunger. A finger which protrudes from the counterweight rides in a recess on the plunger. In the event of a sudden shock to the disc drive, the shock force acts simultaneously on the plunger and the counterweight. The mass of the plunger, the mass of the counterweight and their relative distances from the pivot are designed such that the shock force is neutralized, preventing the plunger from moving back toward the solenoid and releasing the carriage. Furthermore, by proper sizing of the aforementioned variables, the mechanical time constant (time it takes for the lock to react) can be adjusted so that the lock will not interfere with carriage motion in the event of high speed motion onto the crash stops.

The advantages and technical features of this invention will become more apparent from a study of the following disclosure, wherein FIG. 1 is a top plan view of a linear actuator mounted in a housing of the type in which this invention is particularly useful and showing the positional relationship of the lock, motor, and storage discs;

FIG. 2 is an exploded isometric view of the lock of this invention;

FIG. 3 is an isometric view of an assembled lock of the type shown in FIG. 2;

FIG. 4 is a top view of the lock and carriage with the carriage entering the lock area;

FIG. 5 is a top view of the lock and carriage in the locked position; and

FIG. 6 is a top view of the lock in the activated position with the plunger withdrawn from the carriage.

FIG. 1 shows a standard disc drive arrangement of the type shown in the incorporated patent application, including a voice coil drive motor 10 driving a carriage 12 carrying transducer heads from track to track on disc 14. When power is to be removed from the drive, the carriage is driven to a home position fully retracted from that portion of the disc on which the data is stored, and the carriage is engaged by the dynamic lock 16 of this invention.

FIG. 2 shows in exploded view the basic mechanical elements of this invention. The dynamic lock is carried in a frame generally shown at 30 with the plunger extending out toward the carriage through a window 32. The plunger itself 34 is positionally controlled by a solenoid 36. It is biased toward the carriage by spring 38. When the solenoid 36 is activated, the plunger 34 is pulled back toward the solenoid against the pressure of spring 38. The counterweight 40 is rotationally fastened by pin 42 to a ledge 44 of frame 30, using a pin 50.

The assembled lock appears in FIG. 3, with the weight 40 pinned in place by pin 42, and the solenoid 36 retracting the tip 52 of plunger 34. The operation of the dynamic lock is shown clearly in FIGS. 4, 5 and 6. These figures show the various positions of the counterweight 40 and its finger 42 which extends into a recess 60 in the side of the plunger facing the counterweight. Entering the home position as shown in FIG. 4, the carriage extension 62 strikes the tip 64 of plunger 34. This pushes the plunger 34 into the solenoid 36, permitting the carriage 12 to move past the plunger. The spring 38 biases the plunger back out toward the carriage. Thus, when the carriage 12 has moved into the position shown in FIG. 5, the plunger 34 is propelled by the spring 38 back into the recess 66 to capture the carriage between the crash stop 68 and the plunger. This capture position is shown clearly in FIG. 5.

To release the carriage, power is applied to the solenoid, retracting the plunger 34 and compressing the spring as shown in FIG. 6. The carriage is now free to be driven away from the crash stop by the voice coil motor.

Special significance of this invention lies in its operation during application of a shock load which would move the plunger into the solenoid, thereby releasing the carriage. It must be remembered that it is highly desirable to utilize a very weak spring, such that other means of preventing plunger movement must be utilized.

During application of a shock load to the disc drive housing, the shock load forces applied to the entire assembly via the housing of the disc drive itself and frame 30. During large shock loads, the spring 38 does not provide sufficient force to overcome the inertia of the plunger 34. As a result, the plunger begins to move relative to the solenoid. This has the same effect of the plunger retraction step of FIG. 6, freeing the carriage for movement.

The counterweight 40 is designed such that the shock load applied to the plunger will be transmitted through finger 42 into the counterweight. Because the finger is directed against the direction of rotation of the plunger, the shock is carried to the counterweight 40, in a direction opposite the shock load. As the mass moment of the counterweight is equal to the mass moment of the plunger, and their directions are opposite, the shock force applied to the plunger is neutralized. The counterweight system of this invention allows the usage of a relatively weak return spring or bias spring 24, and in turn allows the use of a small, inexpensive, low powered solenoid without the danger of unintended release of the carriage lock. Because the counterweight can rotate about the frame, the lever 42 can rotate within the recess when power is applied by the solenoid 40, retracting the plunger against the bias of spring 34. The counterweight restrains movement of the plunger only in the event of sharp force being applied to the frame 30 in the retraction direction of the plunger.

Should a malfunction of the drive cause full power to be applied to the voice coil motor and in turn cause the carriage to accelerate, uncontrolled, into the home position, the carriage 12 will reach a relatively high velocity upon entering the lock area. As the carriage is not controlled, there is no electronic means of decelerating the carriage. Therefore, the crash stop 68 has been provided made of a suitable material such as rubber to decelerate the carriage. Under these high-speed conditions, the carriage pushes the lock plunger 34 into the solenoid as it moves past, similar to operation under normal conditions. Upon coming in contact with the crash stop, the rubber is compressed and the motion of the carriage is stopped. The crash stop is designed such that the carriage is decelerated at a controlled rate in order to avoid damage to the carriage heads. As the rubber has been compressed, however, it acts as a spring propelling the carriage out of the home position at a relatively high velocity. Reengagement of the latch at this point would subject the carriage and head transducer to a relatively high shock, potentially causing damage. However, in this invention and under the conditions of high-speed impact, as the counterweight has allowed use of a weak return spring, reengagement of the carriage by the plunger is avoided.

After the carriage has pushed the plunger 34 into the solenoid and has continued travelling into the crash stop, the return spring will be applying a force to the plunger to return it to its original position. This invention utilizes a relatively weak return spring 38. Therefore, the plunger return force will be small, and the acceleration of the plunger slow. Thus, the carriage 12 will compress the crash stop, rebound and travel out of the lock area before the plunger travels to a point where it could engage the carriage.

Other features and advantages of the claimed invention will become apparent to a person of skill in the art who studies this disclosure. Therefore, the scope of this invention is to be limited only by the following claims.

What is claimed:

1. In an actuator having a frame and a transducer carriage for positioning a transducer with respect to a recording media, a dynamic lock mechanism for holding said carriage in a fixed position relative to said frame comprising a plunger guided by a solenoid and a further frame for movement between a first position wherein said plunger engages an extension on said carriage to lock said carriage in said fixed position and a second position wherein said plunger is withdrawn from said carriage to allow said carriage to position said transducer with respect to a recording media, spring means surrounding said plunger for normally biasig said plunger into said first position, said solenoid being responsive to a signal to withdraw said plunger from said first position to said second position, and shock absorbing means comprising a counterweight pivotally linked to said plunger for absorbing a shock applied to said frame and preventing movement of said plunger away from said first position in the absence of actuation of said solenoid.

2. A dynamic lock as in claim 1 wherein said spring means provides a relatively weak force compared to the force created by a shock load acting on said plunger.

3. A dynamic lock as in claim 1 wherein the mass moment of said counterweight is substantially equal to the mass moment of said plunger about a pivot fixed to said further frame, whereby shock loads applied to said plunger are offset by said counterweight halting movement of said plunger away from said first position.

4. A dynamic lock as in claim 1 including means for mounting the counterweight to said further frame guiding said plunger, and means for linking said counterweight to an end of said plunger near to said carriage, said counterweight allowing free movement of said plunger in response to actuation of said solenoid, and offsetting shocks to said plunger to prevent movement thereof in the absence of actuation of said solenoid.

5. A dynamic lock as in claim 4 wherein said plunger has a recess in a side thereof facing said counterweight, said counterweight linking means including a finger mounted for rotation on an edge of said further frame and extending into said recess of said plunger.

6. A dynamic lock as in claim 5 wherein the mass moment of said counterweight is substantially equal to the mass moment of said plunger about said pivot, whereby shock loads applied to said plunger are offset by said counterweight without movement of said plunger away from said first position.

7. In a storage device having a rotatable storage media with a plurality of data tracks, an actuator having a transducer carriage driven by a motor along a linear path for positioning a transducer to co-act with a desired data track, a locking mechanism positioned at right angles to said linear path between said motor and said rotatable storage media comprising a plunger guided by a solenoid and a frame for movement between a first position wherein said plunger engages an extension of said carriage to lock said carriage in said fixed position and a second position wherein said plunger is withdrawn from said carriage to allow said carriage to position said transducer with respect to a recording media, spring means surrounding said plunger for normally biasing said plunger into said first position, said solenoid being responsive to a signal to withdraw said plunger from said first position to said second position, and shock absorbing means comprising a counterweight mechanically linked to said plunger for absorbing a shock applied to said frame and pointing movement of said plunger away from said first position in the absence of actuation of said solenoid, the mass moment of said counterweight being substantially equal to the mass moment of said plunger about a pivot, whereby shock loads fixed to said frame applied to said plunger are offset by said counterweight without movement of said plunger away from said first position.

8. A dynamic lock as in claim 7 wherein said spring means provides a relatively weak force compared to the force created by a shock load acting on said plunger.

9. A dynamic lock as in claim 8 including means for mounting the counterweight on the edge of the frame guiding said plunger, and means for linking said counterweight to an end of said plunger near to said carriage, said counterweight allowing free movement of said plunger in response to actuation of said solenoid, and offsetting shocks to said plunger to prevent movement thereof in the absence of actuation of said solenoid.

* * * * *